W. M. FOGLE.
PROCESS FOR RESHARPENING SAW BLADES.
APPLICATION FILED MAY 31, 1916.
1,222,195.
Patented Apr. 10, 1917.
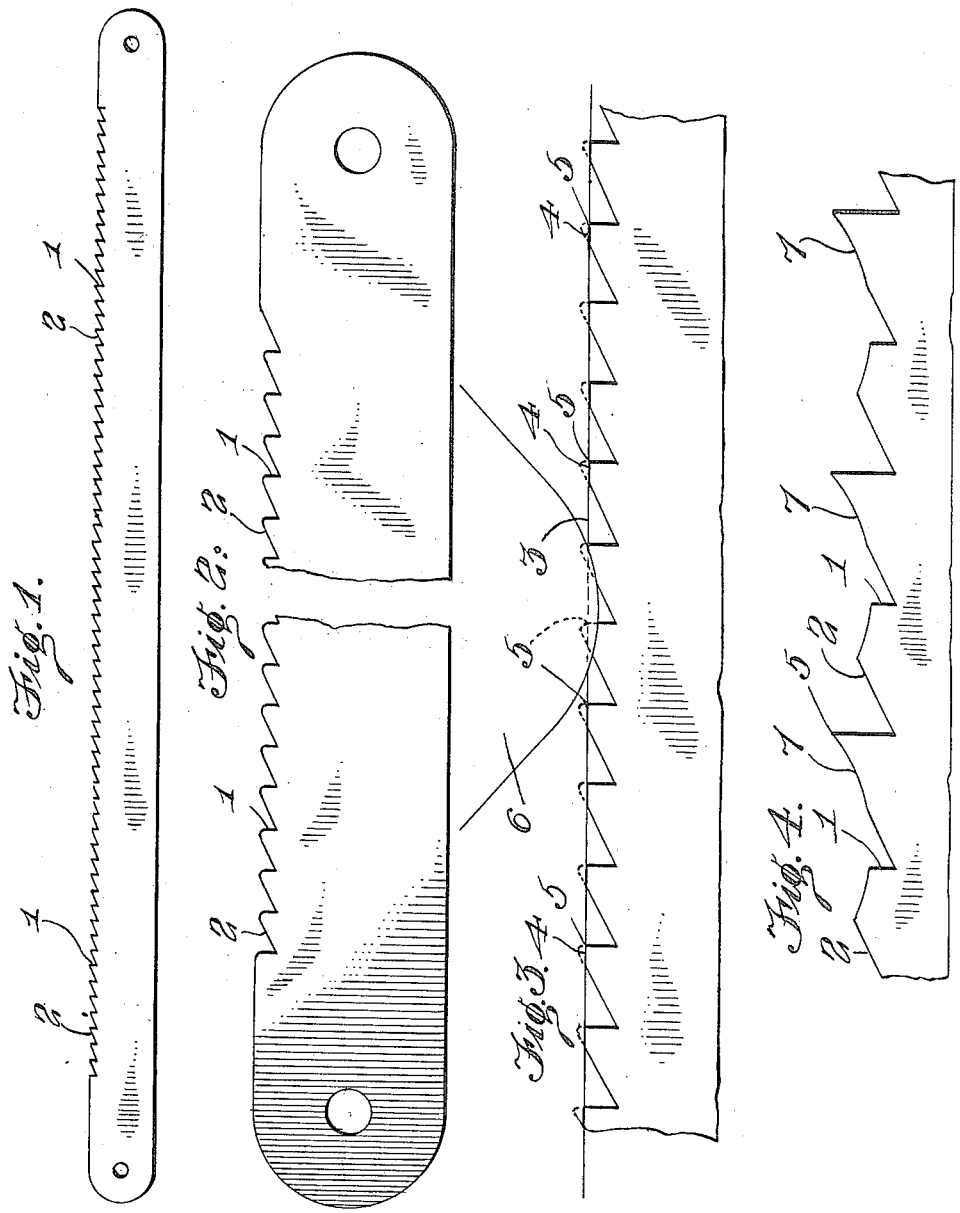
Inventor
William M. Fogle
By Carroll Bailey
Attorney

UNITED STATES PATENT OFFICE.

WILLIAM M. FOGLE, OF DANSVILLE, NEW YORK.

PROCESS FOR RESHARPENING SAW-BLADES.

1,222,195.  Specification of Letters Patent.  Patented Apr. 10, 1917.

Application filed May 31, 1916. Serial No. 100,757.

*To all whom it may concern:*

Be it known that I, WILLIAM M. FOGLE, a citizen of the United States, residing at Dansville, in the county of Livingston and State of New York, have invented certain new and useful Improvements in Processes for Resharpening Saw-Blades, of which the following is a specification.

This invention relates to an improved method of sharpening the teeth of saw blades, and has particular reference to a method for resharpening the teeth of used saw blades, whereby an improved article of this character is provided.

The principal object of the invention resides in the provision of a method for resharpening the teeth of saw blades which may be practised successively upon the teeth of a single blade, and which will provide a blade of increased efficiency, acting upon the original teeth thereof in such a manner as to sharpen certain of the same and cause those remaining to act as cleaners for the kerf cut by the sharpened ones.

Another object of the invention resides in the provision of a process for the purpose mentioned which may be practised in a minimum of time and which will act upon the teeth of a saw in such a manner as to cause the same to cut faster and last longer than when in its original state.

In describing the improved article and the method of producing the same, reference will be had to the accompanying drawings, wherein:

Figure 1 is a side elevation of a saw blade in its original state.

Fig. 2 is a similar view of the blade after its teeth have been dulled by use.

Fig. 3 is an enlarged fragmentary view illustrating the method of operating upon the teeth of the saw to resharpen the same, and, Fig. 4 is a similar view showing the teeth after they have been resharpened.

It is well known that after a saw blade of that type most commonly termed "hack saw blades", as illustrated in Fig. 1 of the drawings, has been used a short length of time the cutting edges of the teeth become rounded or dulled as illustrated in Fig. 2 of the drawings.

Now, in carrying out the method of resharpening these rounded or dulled teeth, which are of the ordinary form, that is, of substantially triangular shape, having one substantially straight edge, as indicated by the numeral 1 and an angular edge as indicated at 2, the first step is to draw the teeth over a cutting element, such as an emery wheel or the like, until the material of the teeth at their cutting points is ground away below the lowermost point upon the straight edge 1 to which the rounded or dulled portion extends. The light line indicated by the numeral 3 illustrates the depth of the cut made into the teeth by the cutting element on carrying out this initial operation, and it is to be here noted that after the rounded edges of the teeth have been cut away a flat face is left remaining upon each of the teeth as indicated by the numeral 4 in Fig. 3 of the drawings, such flat face coacting with the straight edge 1 to provide a sharp point 5, as is shown.

The next step is to place one angular edge 2 of one of the teeth against one corner of the emery wheel, indicated at 6, and grind this edge until the flat face 4 is cut away and the angular edge 2 again intersects the straight edge 1, thus providing a sharp cutting portion at the point 5, as will be understood. This operation is repeated upon alternate of the teeth through the length of the blade. Now, it is clear that by grinding alternate of the teeth in this manner the remaining teeth will be cut down by the emery wheel to substantially one half their original depth, but it is to be noted that in cutting the angular edge 2 of one tooth the emery wheel is not permitted to touch the straight edge of the alternate tooth to the rear, so that in grinding one tooth the point 5 of the alternate one is in no way affected.

By reference to Figs. 3 and 4 of the drawings, it will be noted that each sharpened tooth is cut arcuately upon its angular face, as indicated at 7, and it will be obvious that a tooth so shaped, will require more use to round or dull its cutting point than a tooth having a straight angular edge, as in the teeth of the blade originally. It will also be obvious that the ground off teeth will act as cleaners for the kerf cut by the resharpened teeth, thereby in no way lessening the efficiency of the blade after being resharpened by the herein described method.

After the resharpened teeth have become dulled or rounded, the method may be repeated until the teeth have been entirely ground away, thus effecting a saving not only in material but in expense, as it is well known that the usual practice now is to discard saw blades of the character mentioned after the same have once become dulled.

From the foregoing description, taken in connection with the accompanying drawings, it is thought that the steps necessary to provide the improved resharpened saw blade will be clearly understood, and while I have herein shown and described the invention, I do not wish to be limited thereto, except for such limitations as the claims may import.

I claim:

1. The method of resharpening the teeth of used saw blades which consists in first cutting away portions of all of the teeth to be sharpened, and then cutting away portions of alternate of the teeth.

2. The method of resharpening the teeth of used saw blades which consists in first removing portions of all of the teeth, and then cutting away portions of each individual tooth to be sharpened.

3. The method of resharpening the substantially triangularly shaped teeth of used saw blades which consists in cutting away portions of the angular edges of the teeth to be sharpened.

4. The method of resharpening the teeth of used saw blades which consists in cutting away portions of alternate of the teeth, and simultaneously reducing the height of the teeth between the alternately cut away teeth.

In testimony whereof I affix my signature in the presence of two witnesses.

WILLIAM M. FOGLE.

Witnesses:
L. E. STOUT,
FRANK H. JOHANTGEN.

Copies of this patent may be obtained for five cents each, by addressing the "Commissioner of Patents, Washington, D. C."